United States Patent
Krell et al.

(10) Patent No.: US 7,298,843 B2
(45) Date of Patent: Nov. 20, 2007

(54) METHOD AND APPARATUS FOR SEEDING A RANDOM NUMBER GENERATOR

(75) Inventors: Sherry L Krell, Sacramento, CA (US); Sergey V. Gerasimov, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 851 days.

(21) Appl. No.: 10/633,059

(22) Filed: Aug. 1, 2003

(65) Prior Publication Data

US 2005/0036610 A1 Feb. 17, 2005

(51) Int. Cl.
*H04L 9/00* (2006.01)
(52) U.S. Cl. ........................................................ 380/46
(58) Field of Classification Search .................. 380/46, 380/47
See application file for complete search history.

(56) References Cited

U.S. PATENT DOCUMENTS 5,463,689 A * 10/1995 Schutte et al. .............. 380/209
6,865,660 B2 * 3/2005 Duncan ...................... 711/217

* cited by examiner

*Primary Examiner*—Kambiz Zand
*Assistant Examiner*—Andrew L Nalven

(57) ABSTRACT

Disclosed are systems and methods for seeding a random number generator, comprising retrieving a first data block from a memory; initially seeding the random number generator using the first data block as a seed; retrieving a number generated by the random number generator; mapping the number to a memory address in the memory using a mathematical function; retrieving a successive data block from the memory address; and successively seeding the random number generator with a combination of the seed and the successive data block such that the combination of the seed and the successive data block becomes a resulting seed.

24 Claims, 3 Drawing Sheets

METHOD AND APPARATUS FOR SEEDING A RANDOM NUMBER GENERATOR

SUMMARY OF THE INVENTION

The present invention relates generally to the operation of computer systems and more specifically to the generation of random or pseudo-random numbers in computer systems.

In the operation of computer systems, it is often desirable to generate random numbers for use in certain applications such as simulations, games, and secure communications. A random number is a sequence of numbers in which no number is more likely to occur at a given place in the sequence than any other number. Generation of a truly random number is generally considered to be impossible, but computer processes may generate numbers called "pseudo-random numbers" that are sufficiently unpredictable to serve an intended purpose. These pseudo-random numbers are hereinafter called "random numbers," and their generation "random number generation," in conformance with common usage.

One prior method of generating random numbers in a computer system relies on the collection of random data over time from the computer system itself for use as a seed, i.e., a starting value used in generating random numbers, for a random number generator. Another prior method relies directly or indirectly on user interaction via, e.g., a keyboard or mouse, for random data to use as a random number generator seed.

In some circumstances, however, user input is not available, for example, for embedded devices requiring no user interaction and having no user interfaces. Further, if one or more random numbers are required in a short time, for example, almost immediately after startup, there may not be enough time for the collection of random data for a seed. In addition, where the resources from which random data may be gathered are limited, for example in the limited memory of an embedded device, the data available may be insufficient to provide enough random data for a random number generator seed.

DETAILED DESCRIPTION

Broadly stated, the present invention is directed to apparatus and methods for seeding a random number generator in a computer system without user interaction, network connection, or an elapsed period of time to collect data to form a seed, allowing a requirement for a random number to be fulfilled by a random number generator in a relatively short time, e.g., immediately after power-up of a computer device.

Figure 1:
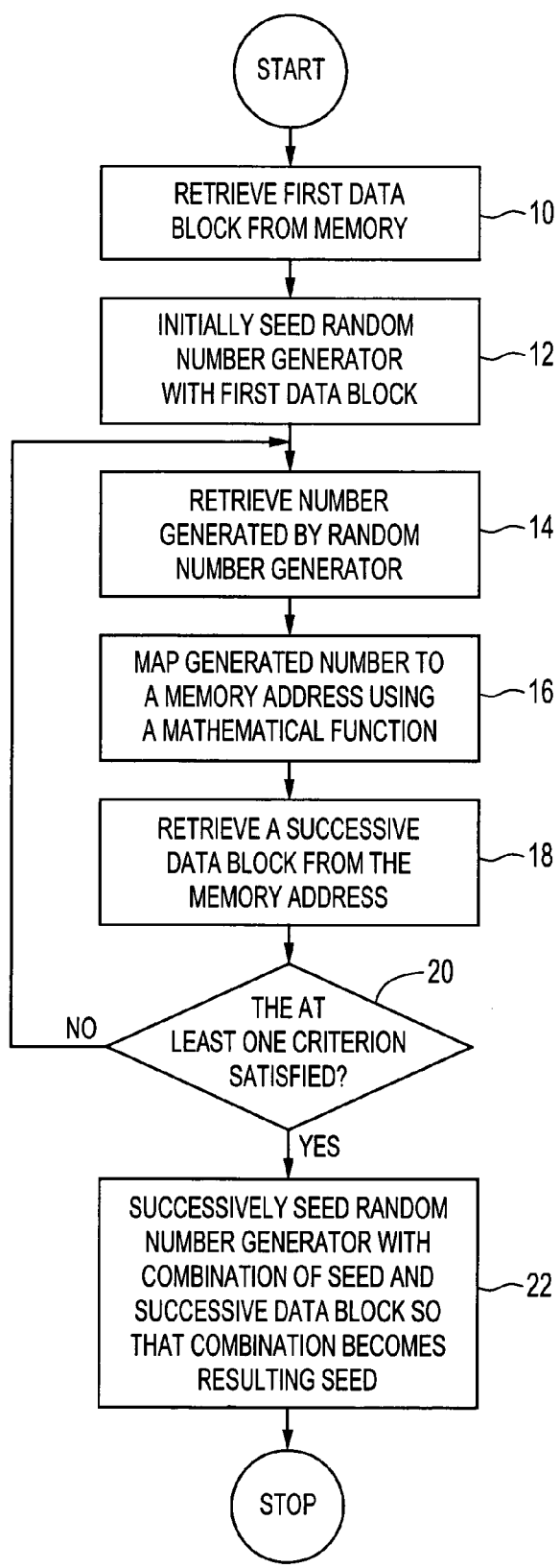
FIG. 1 is a flowchart showing an embodiment of the invention.

Turning now to FIG. 1, showing a flowchart for an embodiment of the invention, a first data block is retrieved from memory (10). The first retrieved data block may include but is not limited to previously stored data or a unique identifier for a device or component such as a media access control ("MAC") address. A random number generator is initially seeded with the retrieved first data block (12). The random number generator generates a number and that number is retrieved (14). The generated number is mapped to a memory address using a mathematical function (16). A successive memory block is retrieved starting at the memory address to which the generated number was mapped (18).

The successive data block retrieved by step 18 is tested for satisfaction of at least one criterion for the suitability of the seed (20), and if the at least one criterion is not satisfied, steps 14, 16, 18, and 20 are repeated until the at least one criterion is satisfied. In embodiments of the invention in which step 20 tests for satisfaction of more than one criterion, the testing may be satisfied if one, some, or all of the criteria are satisfied, depending on the application in which the embodiments are being used. Use of the phrase "at least one criterion" is not intended to limit embodiments of the invention to satisfaction of only one of a plurality of criteria when a plurality of criteria are employed.

When the at least one criterion is satisfied, the successive memory block and the seed are combined, and the combination becomes the resulting seed of the random number generator (22). The combination of the successive memory block and the seed may be accomplished by hashing the successive memory block and the seed but is not limited to that method.

In an embodiment of the invention, the mathematical function of step 16 is:

$$f(x) = x \pmod{m} + b \quad \text{for } x < b;$$
$$f(x) = x \quad \text{for } b \leq x \leq b + m; \text{ and}$$
$$f(x) = x \pmod{m} + b \quad \text{for } x > b + m;$$

where x=retrieved number generated by random number generator; b=base memory address; and m=memory size. The base memory address is the address at which the memory available to this embodiment of the invention begins, and the memory size is the size of that available memory.

In an embodiment of the invention, the at least one criterion of step 20 includes an absence of a string of identical bits in said successive data block longer than a specified number of bits. In an embodiment of the invention, that number may the equal to the number of bits in the successive data block.

Figure 2:
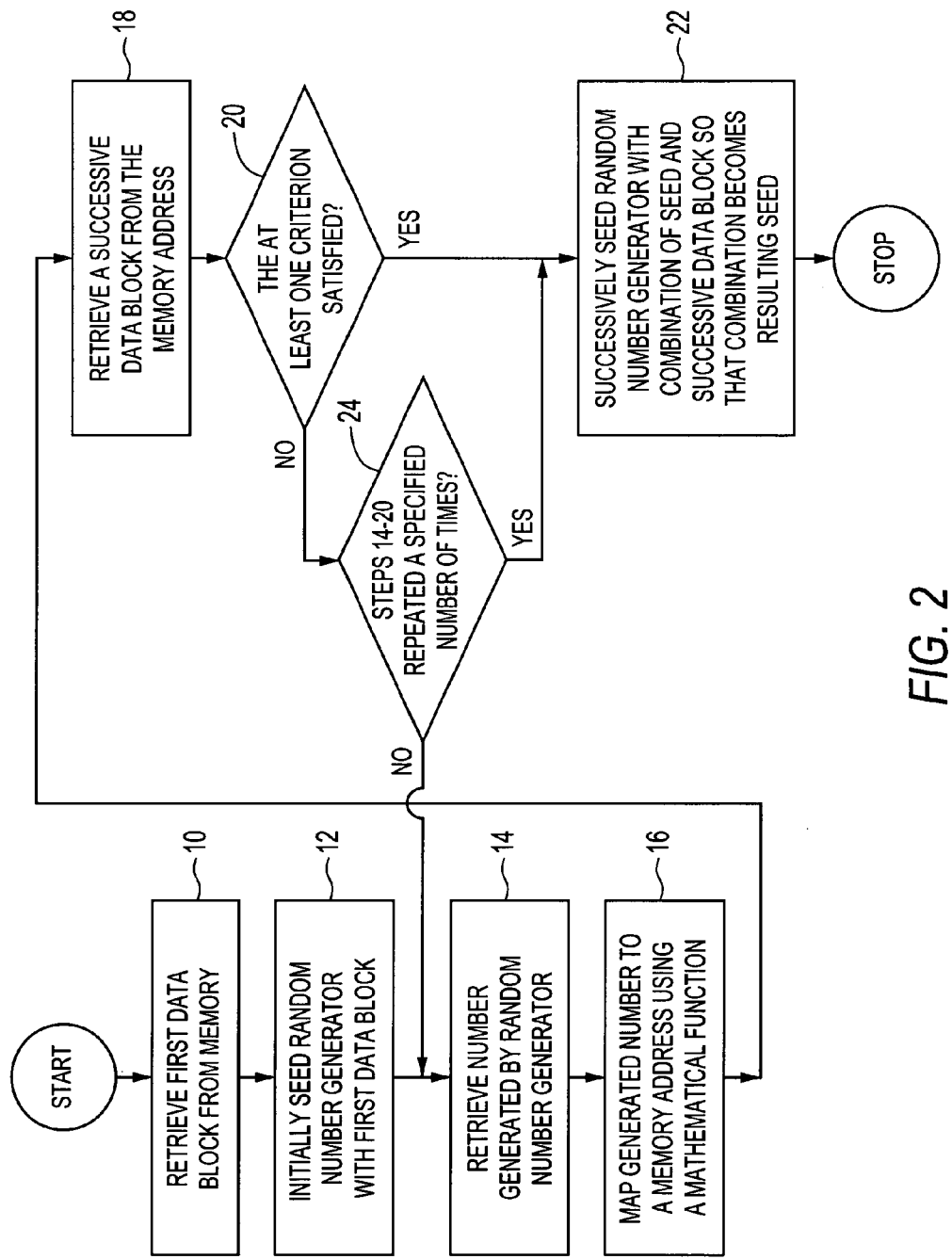
FIG. 2 is a flowchart showing another embodiment of the invention.

Turning now to FIG. 2, showing another embodiment of the invention, steps 10, 12, 14, 16, 18, 20, and 22 are as described in connection with FIG. 1. The successive data block retrieved from memory in step 18 is tested for satisfaction of one or more second criteria (20). If the at least one criterion is not satisfied, a determination is made of the number of times steps 14, 16, 18, and 20 have been repeated due to failure to satisfy the at least one criterion (24). If the number of repetitions of steps 14, 16, 18, and 20 is less than a specified number (e.g., two), steps 14, 16, 18, and 20 are repeated. If step 20 determines that the at least one criterion has been satisfied before step 24 determines that the specified number of repetitions has been accomplished, the next step after step 20 is step 22. If step 24 determines that the specified number of repetitions has been accomplished before step 20 determines that the at least one criterion has been satisfied, the next step after step 24 is step 22.

Figure 3:
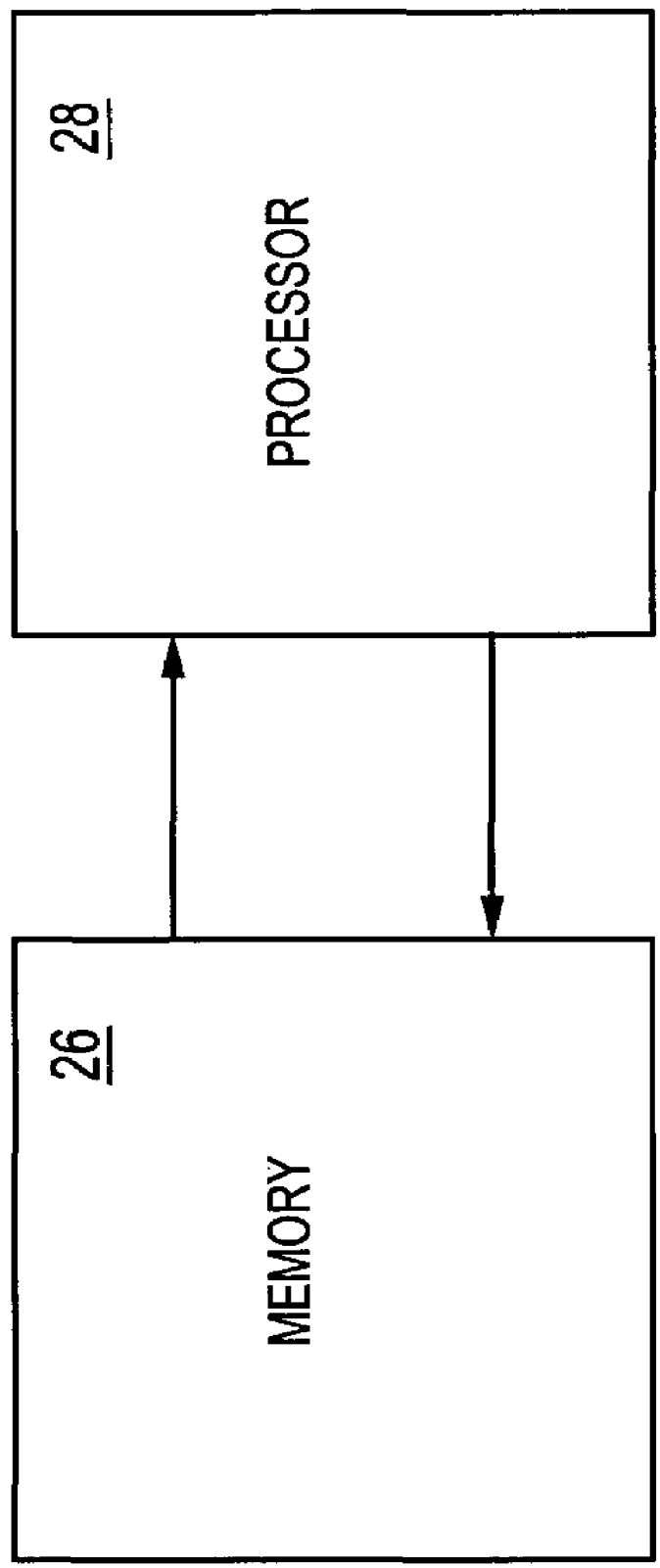
FIG. 3 is a block diagram of an embodiment of the invention.

Turning now to FIG. 3, showing an embodiment of the invention, an apparatus includes a memory 26 and a processor 28. The processor 28 is programmed to (a) retrieve a first data block from a memory; (b) initially seed the random number generator using the first data block as a seed; (c)

retrieve a number generated by the random number generator; (d) map the number to a memory address in the memory using a mathematical function; (e) retrieve a successive data block from the memory address; and (f) successively seed the random number generator with a combination of the seed and the successive data block such that the combination of the seed and the successive data block becomes the resulting seed.

In an embodiment of the invention, the processor 28 is further programmed to perform the further step, defined as (e'), which is to test, after each performance of (e), for satisfaction of at least one criterion and if the at least one criterion is not satisfied, repeat steps (c), (d), (e), and (e').

In an embodiment of the invention in which the processor 28 is programmed to perform step (e') as described above, the processor 28 is further programmed to perform the further step, defined as (e''), which is to check, after each performance of (e'), the number of repetitions of steps (c), (d), (e), and (e') due to failure to satisfy the at least one criterion and stop the repetitions when a specified number of the repetitions have been performed.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the present invention are set forth in the appended claims.

What is claimed is:

1. A method for seeding a random number generator, the method comprising the steps of:
    (a) retrieving a first data block from a memory;
    (b) initially seeding the random number generator using said first data block as a seed;
    (c) retrieving a number generated by the random number generator;
    (d) mapping said number to a memory address in said memory using a mathematical function;
    (e) retrieving a successive data block from said memory address;
    (f) successively seeding the random number generator with a combination of said seed and said successive data block such that said combination of said seed and said successive data block becomes a resulting seed of the random number generator; and
    (e') after each performance of (e), testing for satisfaction of at least one criterion and if said at least one criterion is not satisfied, repeating (c), (d), (e), and (e'),
    wherein a criterion of said at least one criterion is an absence of a string of identical bits in said successive data block longer than a specified number of bits.

2. The method recited in claim 1, wherein said specified number is equal to the number of bits in said successive data block.

3. The method recited in claim 1, further comprising the further step of:
    (e'') after each performance of (e'), checking the number of repetitions of (c), (d), (e), and (e') due to failure to satisfy said at least one criterion and stopping said repetitions when a specified number of said repetitions have been performed.

4. The method recited in claim 3, wherein said specified number of said repetitions is two.

5. A method for seeding a random number generator, the method comprising the steps of:
    (a) retrieving a first data block from a memory;
    (b) initially seeding the random number generator using said first data block as a seed;
    (c) retrieving a number generated by the random number generator;
    (d) mapping said number to a memory address in said memory using a mathematical function;
    (e) retrieving a successive data block from said memory address; and
    (f) successively seeding the random number generator with a combination of said seed and said successive data block such that said combination of said seed and said successive data block becomes a resulting seed of the random number generator,
    wherein said first data block includes an identifier unique to a specified computer device.

6. A method for seeding a random number generator, the method comprising the steps of:
    (a) retrieving a first data block from a memory;
    (b) initially seeding the random number generator using said first data block as a seed;
    (c) retrieving a number generated, by the random number generator;
    (d) mapping said number to a memory addressing said memory using a mathematical function;
    (e) retrieving a successive data block from said memory address; and
    (f) successively seeding the random number generator with a combination of said seed and said successive data block such that said combination of said seed and said successive data block becomes a resulting seed of the random number generator,
    wherein said mathematical function used in said mapping is:

$f(x)=x(\mod m)+b$ for $x<b;$ $f(x)=x$ for $b \leq x \leq b+m;$ and $f(x)=x(\mod m)+b$ for $x>b+m;$ wherein f(x)=said memory address to which said generated number is mapped;
    x=retrieved number generated by random number generator;
    b=base memory address; and
    m=memory size.

7. The method recited in claim 6, wherein said first data block includes previously saved data.

8. The method recited in claim 6, wherein said first data block includes an identifier unique to a specified computer device.

9. A method for seeding a random number generator, the method comprising the steps of:
    (a) retrieving a first data block from a memory;
    (b) initially seeding the random number generator using said first data block as a seed;
    (c) retrieving a number generated by the random number generator;
    (d) mapping said number to a memory address in said memory using a mathematical function;
    (e) retrieving a successive data block from said memory address; and
    (f) successively seeding the random number generator with a combination of said seed and said successive data block such that said, combination of said seed and said successive data block becomes a resulting seed of the random number generator, wherein said combination of said seed and said successive data block is accomplished by hashing said seed and said successive data block.

10. An apparatus for seeding a random number generator, the apparatus comprising:
   a memory; and
   a processor operatively coupled to said memory, wherein said processor is programmed to:
   (a) retrieve a first data block from said memory;
   (b) initially seed the random number generator using said first data block as a seed;
   (c) retrieve a number generated by the random number generator;
   (d) map said number to a memory address in said memory using a mathematical function;
   (e) retrieve a successive data block from said memory address;
   (f) successively seed the random number generator with a combination of said seed and said successive data block such that said combination of said seed and said successive data block becomes a resulting seed of the random number generator; and
   (e') after each performance of (e), test for satisfaction of at least one criterion and if said at least one criterion is not satisfied, repeat (c), (d), (e), and (e'),
   wherein a criterion of said at least one criterion is an absence of a string of identical bits in said successive data block longer than a specified number of bits.

11. The apparatus recited in claim 10, wherein said processor is further programmed to:
   (e") after each performance of (e'), check the number of repetitions of (c), (d), (e), and (e') due to failure to satisfy said at least one criterion and stop said repetitions when a specified number of said repetitions have been performed.

12. The apparatus recited in claim 10, wherein said first data block includes an identifier unique to a specified computer device.

13. The apparatus recited in claim 10, wherein said first data block includes previously saved data.

14. The apparatus recited in claim 10, wherein said combination of said seed and said successive data block is accomplished by hashing said seed and said successive data block.

15. An apparatus for seeding a random number generator, the apparatus comprising:
   (a) means for retrieving a first data block from a memory;
   (b) means for initially seeding the random number generator using said first data block as a seed;
   (c) means far retrieving a number generated by the random number generator;
   (d) means for mapping said number to a memory address in said memory using a mathematical function;
   (e) means for retrieving a successive data block from said memory address;
   (f) means for successively seeding the random number generator with a combination of said seed and said successive data block such that said combination of said seed and said successive data block becomes a resulting seed of the random number generator; and
   (e') means for testing for satisfaction of at least one criterion after each use of said means for said retrieving said successive data block of (e), and if said at least one criterion is not satisfied, repeating (c), (d), (e), and (e'),
   wherein a criterion of said at least one criterion is an absence of a string of identical bits in said successive data block longer than a specified number of bits.

16. The apparatus recited in claim 15, further comprising:
   (e") means for checking the number of repetitions of (c), (d), (e), and (e") due to failure to satisfy said at least one criterion after each use of said means for said testing and repeating of (e'), and stopping said repeating when a specified number of said repetitions have been performed.

17. The apparatus recited in claim 15, wherein said first data block includes an identifier unique to a specified computer device.

18. The apparatus recited in claim 15, wherein said first data block includes previously saved data.

19. The apparatus recited in claim 15, wherein said combination of said seed and said successive data block is accomplished by hashing said seed and said successive data block.

20. A computer-readable medium having computer-readable instructions for performing a method of seeding a random number generator, the method comprising the steps of:
   (a) retrieving a first data block from a memory;
   (b) initially seeding the random number generator using said first data block as a seed;
   (c) retrieving a number generated by the random number generator;
   (d) mapping said number to a memory address in said memory using a mathematical function;
   (e) retrieving a successive data block from said memory address;
   (f) successively seeding the random number generator with a combination of said seed and said successive data block such that said combination of said seed and said successive data block becomes a resulting seed of the random number generator; and
   (e') after each performance of (e), testing for satisfaction of at least one criterion and if said at least one criterion is not satisfied, repeating (c), (d), (e), and (e'),
   wherein a criterion of said at least one criterion is an absence of a string of identical bits in said successive data block longer than a specified number of bits.

21. The computer-readable medium recited in claim 20, wherein said method further comprises the further step of:
   (e") after each performance of (e'), checking the number of repetitions of (c), (d), (e), and (e') due to failure to satisfy said at least one criterion and stopping said repetitions when a specified number of said repetitions have been performed.

22. The computer-readable medium recited in claim 20, wherein said first data block includes an identifier unique to a specified computer device.

23. The computer-readable medium recited in claim 20, wherein said first data block includes previously saved data.

24. The computer-readable medium recited in claim 20, wherein said combination of said seed and said successive data block is accomplished by hashing said seed and said successive data block.

* * * * *

UNITED STATES PATENT AND TRADEMARK OFFICE
CERTIFICATE OF CORRECTION

PATENT NO.         : 7,298,843 B2
APPLICATION NO.    : 10/633059
DATED              : November 20, 2007
INVENTOR(S)        : Sherry L. Krell et al.

It is certified that error appears in the above-identified patent and that said Letters Patent is hereby corrected as shown below:

In column 4, line 65, in Claim 9, after "said" delete ",".

In column 5, line 50, in Claim 15, delete "far" and insert -- for --, therefor.

In column 6, line 7, in Claim 16, delete "(e'')" and insert -- (e') --, therefor.

Signed and Sealed this

Third Day of June, 2008

JON W. DUDAS
*Director of the United States Patent and Trademark Office*